United States Patent [19]

Dönges et al.

[11] Patent Number: 6,090,928
[45] Date of Patent: Jul. 18, 2000

[54] PROCESS FOR THE PREPARATION AND WORK-UP OF N-HYDROXYALKYLCHITOSANS SOLUBLE IN AQUEOUS MEDIUM

[75] Inventors: Reinhard Dönges, Bad Soden; Diethart Reichel, Darmstadt; Birgit Kessler, Frankfurt am Main, all of Germany

[73] Assignee: Clariant GmbH, Germany

[21] Appl. No.: 08/217,189

[22] Filed: Mar. 24, 1994

[30] Foreign Application Priority Data

Mar. 27, 1993 [DE] Germany ............................ 43 10 088

[51] Int. Cl.$^7$ ..................................................... C08B 37/08
[52] U.S. Cl. .............................................. 536/20; 536/124
[58] Field of Search ....................................... 536/20, 124

[56] References Cited

U.S. PATENT DOCUMENTS

| | | | |
|---|---|---|---|
| 4,835,266 | 5/1989 | Lang et al. | 536/20 |
| 4,845,204 | 7/1989 | Lang et al. | 536/20 |
| 4,923,977 | 5/1990 | Lang et al. | 536/20 |
| 4,954,619 | 9/1990 | Lang et al. | 536/20 |
| 4,976,952 | 12/1990 | Lang et al. | 424/47 |

FOREIGN PATENT DOCUMENTS

| | | |
|---|---|---|
| 57-180602 | 1/1983 | Japan . |
| 58-109502 | 9/1983 | Japan . |
| 4-216801 | 8/1992 | Japan . |
| 0978495 | 12/1964 | United Kingdom . |

OTHER PUBLICATIONS

Derwent Publications, Database WPI, Week 9238 (1992) AN 311912, month not available.

*Primary Examiner*—Kathleen K. Fonda
*Attorney, Agent, or Firm*—Connolly Bove Lodge & Hutz LLP

[57] ABSTRACT

The present invention relates to a process for the preparation and work-up of N-hydroxyalkylchitosans soluble in aqueous media, comprising the measures dispersion of chitosan in an aqueous medium, subsequent hydroxyalkylation of the dispersed chitosan and subsequent work-up of the N-hydroxyalkylchitosan, which comprises carrying out the hydroxyalkylation up to an average degree of substitution (DS) of 2.0, preferably 1.5 to 2.0, if desired removing some of the aqueous medium after the hydroxyalkylation and before the work-up and performing the work-up of the N-hydroxyalkylchitosan by drying.

12 Claims, No Drawings

PROCESS FOR THE PREPARATION AND WORK-UP OF N-HYDROXYALKYLCHITOSANS SOLUBLE IN AQUEOUS MEDIUM

Chitosan is a polysaccharide of 2-amino-2-deoxyglucose units. It is usually prepared from chitin, a polysaccharide of 2-N-acetylamino-2-deoxyglucose units, via alkaline hydrolysis of the N-acetyl groups. Chitin is a natural product and is contained as a structural material in crustacea and fungal mycelia. In commercially available chitosans, generally 60 to 90% of the N-acetyl groups originally present in chitin are hydrolyzed.

In the processes conventional hitherto for the preparation of chitosan derivatives, the chitosan is reacted in the presence of water, organic solvents or in aqueous-organic phase with reagents which according to prior art are capable per se of reacting with polysaccharides or amines. The reaction is preferably carried out in suspension. The reactions can be carried out either without catalyst or in the acidic range in the presence of acid catalysts (e.g. acetic acid, hydrochloric acid) or in the alkaline range in the presence of bases (e.g. alkali metal hydroxides or tertiary amines).

When alkylating reagents, e.g. alkylene oxides, are used in neutral or acid environment, N-derivatization of the chitosan occurs preferentially, and in the basic environment O-derivatization occurs preferentially.

The work-up of the chitosan derivatives is conventionally performed by extraction of the by-products and the reagents employed and not consumed in the reaction and/or the medium in which the reaction was carried out.

EP-B-0 224 045 gives a process for the preparation of N-hydroxypropylchitosan which is characterized in that a chitosan comprising 60 to 96% of deacetylated chitin, or a salt thereof, is reacted in the presence of acid catalysts, e.g. hydrochloric acid, in a dispersion of excess propylene oxide and water. After the reaction is terminated, the excess alkylating agent is removed, any insoluble portions present are separated off from the solution of the chitosan derivative by filtration, the solution is neutralized if necessary, concentrated on the rotary evaporator and the chitosan derivative is precipitated in acetone. In order to remove entrained propylene glycols, the precipitated derivative is finely dispersed by a homogenizer; the precipitate is collected on a glass sinter vacuum filter, washed thoroughly with acetone and then dried in the vacuum drying cabinet at 50° C.

The preparation process described provides that the precipitation and work-up of the product are carried out with a readily flammable organic solvent (acetone). It is a disadvantage with this process that, because of the use of readily flammable solvents, the process can only be used with difficulty in the production area. A further disadvantage for the economic efficiency of such a process is the expensive acid-resistant outfitting required of the reactor.

JP-A2-3/234,702 (applicant: Dainichi Seika Colour & Chemicals Mfg. Co., Ltd.) deals with N-hydroxypropylchitosan, which insoluble in water or water/alcohol mixtures, having a mean degree of substitution (DS) in the range 0.1 to 1.2 which is distinguished by a low degree of impurities, and the preparation thereof.

In the preparation, the comminuted chitosan is dispersed in a reaction medium. Suitable reaction media are water or a mixture of water and a water-soluble organic solvent, e.g. isopropanol. In order to obtain a product as homogeneous as possible, the chitosan is dispersed in the reaction medium in a particle size of 50 to 1,000 µm.

The concentration of the dispersion is conventionally 5 to 20 parts by weight of chitosan/100 parts by weight of reaction medium. The hydroxypropylation of the above-described comminuted chitosan must be carried out in dispersion. The amount of propylene oxide used is conventionally 100 to 800 parts by weight based on 100 parts by weight of chitosan. The reaction period is generally from 10 to 50 hours. During this time, the reaction temperature is gradually increased and the reaction is carried out in the region of the boiling point of the reaction medium or the propylene oxide. It is essential to the invention that the hydroxypropylation is terminated when an average degree of substitution (DS) of 1.2 is reached. After hydroxypropylation has been carried out, the reaction product is filtered off and washed with a wash solution, e.g. water or a water/alcohol mixture, the water-soluble impurities being almost completely removed. The N-hydroxypropylchitosan thus prepared is insoluble in aqueous solvents, such as water and water/alcohol mixtures. It is a disadvantage of this process that the proposed purification in the form of an extraction of the by-products cannot be employed with respect to water-soluble N-hydroxyalkylchitosans.

It the object of the present invention, starting from the above-described prior art, to provide a process for the preparation and work-up of water-soluble and water/alcohol-soluble N-hydroxyalkylchitosans, in which the products prepared have a low degree of contamination and which succeeds without the use of readily flammable solvents and can preferably be used in the industrial production area.

It has surprisingly been found that by drying the N-hydroxyalkylchitosans after preparation, e.g. by contact drying or convection drying, without prior extraction of the aqueous or aqueous/alcoholic solution, products are obtained having a low degree of impurity, in particular of alkylene oxide, and this process is precisely suitable for the production area.

This drying is expediently carried out in the absence of salts which would be produced by the neutralization necessary after addition of acid or basic catalysts.

When salt-containing reaction mixtures are used, the drying according to the invention leads to salt-containing dry products.

The present invention thus relates to a process for the preparation and work-up of N-hydroxyalkylchitosans soluble in aqueous media, comprising the measures dispersion of chitosan in an aqueous medium, subsequent hydroxyalkylation of the dispersed chitosan and subsequent work-up of the N-hydroxyalkylchitosan, which comprises carrying out the hydroxyalkylation up to an average degree of substitution (DS) of 2.0, preferably 1.5 to 2.0, if desired removing some of the aqueous medium after the hydroxyalkylation and before the work-up, and performing the work-up of the N-hydroxyalkylchitosan by drying.

The process according to the invention is described below.

The starting material used can, in principle, be any chitosan. However, chitosans are preferably used which are deacetylated by 40 to 96%, based on the original chitin, and which have an average degree of polymerization (DP) from 100 to 10,000, preferably from 300 to 8,000.

Water, or a mixture of water and a water-miscible organic solvent preferably serves as aqueous medium in which the chitosan is suspended and in which the subsequent hydroxyalkylation also takes place. The water-miscible organic solvents are preferably selected from the group comprising the alkanols (e.g. methanol, ethanol, 1-propanol, 2-propanol, 1-butanol, 2-butanol, tert-butanol), and/or the ethers (e.g. dioxane).

Based on 100% of mixture of water and organic phase, the proportion of the organic phase is preferably 25 to 75% by weight. The ratio of predominance of aqueous medium to chitosan is preferably 4–12:1.

The hydroxyalkylation of the comminuted chitosan is performed in suspension and proceeds by known processes. The reaction can be carried out with one or more reagent(s) which are used in combination or, alternatively, one after the other. The process steps which must be employed in this substantially depend on which end products are to be prepared and can easily be ascertained. The reagents used are epoxides, such as ethylene oxide, propylene oxide, butylene oxide, 1,2-epoxydodecane, 1,2-epoxyhexadecane, 2,3-epoxy-1-propanol and glycidyl ethers (e.g. (2,3-epoxy-1-propyl)alkyl ethers). The ratio of chitosan to the hydroxylalkylation reagent used is conventionally 1:3–8 mol/mol, based on the chitosan monomer unit.

When the hydroxyalkyation is finished, the products are present as a viscous solution. When aqueous/organic suspension media are used, such as water/isopropanol mixtures, conventionally some of the aqueous medium is removed, e.g. by distillation.

In the preparation of N-hydroxypropylchitosans, the hydroxypropylation preferably takes place in a pressure apparatus at a temperature in the range from 60 to 120° C. The reaction times are between 1 and 7 hours. The use of acid catalysts, such as acetic acid or hydrochloric acid, or basic catalysts such as alkali metal hydroxides or tertiary amines, is not intended.

The further work-up of the moist N-hydroxyalkylchitosan is carried out by drying. The work-up conventional hitherto, e.g. in the form of an extraction of the by-products or the reagents used and not consumed in the reaction and/or the medium in which the reaction was carried out, does not take place. After the extraction is completed, a drying step is necessary.

The process according to the invention saves an extraction step.

Suitable drying methods must comply with the following criteria:
  reduction of the content of hydroxyalkylation reagent in the hydroxypropylchitosan prepared to less than 5 ppm
  conversion of the viscous solution to a product which can be packaged
  complying with the production-related safety aspects.

Drying methods which have proved to be suitable are contact drying and convection drying.

In contact drying, heat from a heating surface is transferred to the material in contact with it by heat conduction. This supply of heat evaporates some of the moisture of the material which escapes—the material becomes dryer. Vacuum pumps or an inert gas stream transport the steam. Contact drying is carried out with apparatuses known from the prior art. Preferred embodiments of contact drying are drying by roller dryers, drum dryers, disk dryers, vibrating channel dryers, cone dryers, thin layer dryers, paddle dryers or mixing/kneading dryers, particularly preferably roller dryers. The abovementioned dryers are described in the article "Im Trend der Zeit" (Kontakttrockner für die Chemie) ["Current Trends" (Contact Dryers for Chemistry)], Franz Thurner, Chemische Industrie January 1992, pp. 42–46.

In roller-drying, the gels obtained after the hydroxyalkylation are conventionally transported via a pump to the rollers. The optimum temperature of the rollers is 90 to 140° C.

Convection drying is preferably carried out by spray-drying. In spray-drying, the moist product is atomized in a drying tower. Single-component nozzles, two-component nozzles or disk atomizers can be used for the atomization.

Contact with the heated drying gas (air, $N_2$) evaporates the solvent mixture (entry temperature of the drying gas 150–350° C.). During this, the product can also be deposited onto product particles introduced already dried (spray granulation).

As a result of the drying, solid products are obtained which
a) have residual moisture contents below 5% by weight,
b) have in all cases residual epoxide contents below 5 ppm,
c) contain, depending on drying conditions, between 4 and 17% by weight of 1,2-alkylene glycol and
d) are easily grindable after the drying.

In the following examples, the preparation and work-up (drying) according to the invention of the N-hydroxyalkylchitosans are described in more detail.

PREPARATION EXAMPLES

Explanation of Abbreviations:

| | |
|---|---|
| PG = | 1,2-propylene glycol |
| DPG = | dipropylene glycol |
| HP-Chit = | hydroxypropylchitosan |
| Chit = | chitosan |
| IPA = | isopropyl alcohol |
| PO = | propylene oxide (1,2-epoxypropane) |
| D-water = | deionized water |

Example 1

Hydroxypropylation of Chitosan (reaction in water)

2.0 kg of chitosan and 13.0 kg of D-water are introduced into a 50-1 reactor. After inert purging (removing the oxygen in the reaction vessel by introducing nitrogen), 3.65 kg of propylene oxide are added with mixing, heated to 100° C. (internal temperature) and kept at 100° C. for 6 hours. After venting the residual pressure, the mixture is cooled to approximately 40° C. and the reactor contents are discharged.

Yield: 18.3 kg of an aqueous reaction mixture having the following composition (% by weight):

| | |
|---|---|
| $H_2O$ | 70.3 |
| PG | 13.3 |
| DPG | 1.1 |
| HP-Chit | 15.3 having $DS_{NC3H6OH} = 1.9$ |
| PO | 130 ppm. |

Example 2

Hydroxypropylation of Chitosan (reaction in isopropyl alcohol/water)

2.0 kg of chitosan and 6.0 kg of D-water and 10.0 kg of 100% pure isopropyl alcohol are introduced into a 50 l reactor. After inert purging, 3.65 kg of propylene oxide are added with mixing, the mixture is heated to 100° C. (internal temperature) and kept at 100° C. for 6 hours. Approximately 12.6 kg of suspension medium/water mixture are then distilled off, the mixture is cooled to approximately 40° C. and the reactor contents are discharged.

Yield: 7.78 kg of an aqueous reaction mixture having the following composition (% by weight):

| | |
|---|---|
| H$_2$O | 40.1 |
| PG | 10.4 |
| DPG | 0.3 |
| IPA | 13.0 |
| HP-Chit | 36.2 having DS$_{NC3H6OH}$ = 1.9 |
| PO | 120 ppm. |

Example 3

Hydroxypropylation of Chitosan (reaction in water at 120° C.)

2.0 kg of chitosan and 13.0 kg of D-water are introduced into a 50 l reactor. After inert purging, 3.65 kg of propylene oxide are added with mixing, the mixture is heated to 120° C. (internal temperature) and kept at 120° C. for 4.5 hours. After cooling to 40° C., the residual pressure is vented. The reactor contents are then discharged.

Yield: 17.9 kg of an aqueous reaction mixture having the following composition (% by weight):

| | |
|---|---|
| H$_2$O | 67.5 |
| PG | 13.2 |
| DPG | 0.8 |
| HP-Chit | 18.5 having DS$_{NC3H6OH}$ = 1.9 |
| PO | 1.5 ppm. |

Example 4

Hydroxypropylation of Chitosan (reaction in isopropyl alcohol/water at 120° C.)

2.0 kg of chitosan and 6.0 kg of D-water and 10.0 kg of 100% pure isopropyl alcohol are introduced into a 50 l reactor. After inert purging, 3.65 kg of propylene oxide are added with mixing, the mixture is heated to 120° C. (internal temperature) and kept at 120° C. for 6 hours. Approximately 11.3 kg of suspension medium/water mixture are then distilled off, 4.0 kg of D-water are added and the reactor contents are mixed for 30 minutes. After cooling to approximately 40° C., the reactor contents are discharged.

Yield: 13.42 kg of an aqueous reaction mixture having the following composition (% by weight):

| | |
|---|---|
| H$_2$O | 53.0 |
| IPA | 9.8 |
| HP-Chit | 27.3 having DS$_{NC3H6OH}$ = 1.9 |
| DPG | 0.4 |
| PG | 9.5 |
| PO | 51 ppm. |

Drying Examples

Example 5

Roller Drying of the Aqueous Reaction Mixtures of the Examples 1 to 4

The reaction mixture is pumped from a heatable product reservoir between the two rollers, The counter-rotation transports the moist material through an adjustable roller gap to the two scraper knives at which the dry product is taken off from the rollers. The dry product is collected in a trough.

The roller dryer can be operated at atmospheric pressure or under vacuum. The roller dryer is heated via a pressurized water heater.

TABLE 1

Results of the roller drying

| Reaction mixture used | | Ex. 1 | Ex. 2 | Ex. 3 | Ex. 4 |
|---|---|---|---|---|---|
| Roller temperature | ° C. | 110 | 110 | 120 | 120 |
| System pressure | mbar | 1013 | 1013 | 1013 | 1013 |
| Initial concentrations | | | | | |
| Hydroxypropylchitosan | % by weight | 15.3 | 36.2 | 18.5 | 27.3 |
| Water | % by weight | 70.3 | 40.1 | 67.5 | 53.0 |
| Propylene glycol | % by weight | 13.3 | 10.4 | 13.2 | 9.5 |
| Dipropylene glycol | % by weight | 1.1 | 0.3 | 0.7 | 0.4 |
| Isopropyl alcohol | % by weight | 0 | 13.0 | 0 | 9.8 |
| Final concentrations (dry product) | | | | | |
| Water | % by weight | 3.6 | 3.6 | 2.5 | 4.6 |
| Propylene glycol | % by weight | 16.5 | 11.0 | 8.7 | 14.6 |
| Dipropylene glycol | % by weight | 2.3 | 0.7 | 2.1 | 1.8 |
| Hydroxypropylchitosan | % by weight | 77.6 | 84.7 | 86.7 | 79.0 |
| Propylene oxide | ppm | <5 | <5 | <5 | <5 |
| Residue (20μ filter) | % by weight | <0.1 | <0.1 | <0.01 | 0.05 |

Example 6

Hydroxypropylation of Chitosan (reaction in water at 120° C.)

2.0 kg of chitosan and 13.0 kg of D-water are introduced into a 50 l reactor. After inert purging, 3.65 kg of propylene oxide are added with mixing, the mixture is heated to 120° C. (internal temperature) and kept at 120° C. for 3 hours. After cooling to 40° C., the residual pressure is vented. The reactor contents are then discharged.

Yield: 17.9 kg of an aqueous reaction mixture having the following composition (% by weight):

| | |
|---|---|
| H$_2$O | 67.5 |
| PG | 13.9 |
| DPG | 0.8 |
| HP-Chit | 17.8 having DS$_{NC3H6OH}$ = 1.8 |
| PO | 19 ppm |

Example 7

Spray-drying of Aqueous Hydroxypropylchitosan

The liquid reaction mixture is transported by a pump to the atomizer. The drying gas nitrogen enters into the air distributor of the spraying tower at the desired temperature via an electrical heater. At the bottom of the tower, the cooled drying gas loaded with dry product is removed by suction by an exhaust fan. In the cyclone separator and the downstream filter chamber, the gas is separated from the solids.

For the spray-drying experiments 7a–7d, the following dilutions with water were made:

7a: 1 part by weight of reaction mixture from Example 6+1 part by weight of water 7b: 2 parts by weight of reaction mixture from Example 6+1 part by weight of water 7c,d: 3 parts by weight of reaction mixture from Example 6+1 part by weight of water

TABLE 2

Results of the spray-drying

| Experiment number | | 7a | 7b | 7c | 7d |
|---|---|---|---|---|---|
| Entry temperature | ° C. | 250 | 250 | 250 | 250 |
| Exit temperature | ° C. | 107 | 117 | 116 | 117 |
| Initial concentrations | | | | | |
| Hydroxypropylchitosan | % | 8.9 | 11.9 | 13.4 | 13.4 |
| Water | % | 83.7 | 78.3 | 75.6 | 75.6 |
| Propylene glycol | % | 6.9 | 9.3 | 10.4 | 10.4 |
| Dipropylene glycol | % | 0.4 | 0.5 | 0.6 | 0.6 |
| Final concentrations dry products: | | | | | |
| Water | % | 2.2 | 4.7 | 1.6 | 3.5 |
| Propylene glycol | % | 1.9 | 2.2 | 1.2 | 1.9 |
| Dipropylene glycol | % | 1.4 | 1.5 | 0.9 | 1.3 |
| Hydroxypropylchitosan | % | 94.5 | 91.6 | 96.3 | 93.3 |
| Propylene oxide | ppm | <5 | <5 | <5 | <5 |
| Residue (20µ filter) | % | 0.06 | 0.05 | <0.05 | <0.05 |

What is claimed is:

1. A process for the preparation and work-up of N-hydroxyalkylchitosans soluble in aqueous medium, consisting essentially of the steps of dispersion of chitosan in an aqueous medium consisting essentially of water, subsequent hydroxyalkylation of the dispersed chitosan with epoxides and subsequent work-up of the N-hydroxyalkylchitosan, which consists essentially of carrying out the hydroxyalkylation up to an average degree of substitution of 2.0 and performing the work-up of the N-hydroxyalkylchitosan by drying.

2. The process as claimed in claim 1, wherein the average degree of substitution is from 1.5 to 1.9.

3. The process as claimed in claim 1, wherein the chitosan is prepared from a chitin, is deacetylated by 40 to 96%, based on the chitin and said chitosan has an average degree of polymerization from 100 to 10,000.

4. The process as claimed in claim 1, wherein the chitosan is prepared from a chitin, is deacetylated by 40 to 96%, based on the chitin and said chitosan has an average degree of polymerization from 300 to 8,000.

5. The process as claimed in claim 1, wherein the ratio of aqueous medium to chitosan is 4–12 parts by weight of aqueous medium to one part by weight of chitosan.

6. The process as claimed in claim 1, wherein the ratio of chitosan to the hydroxyalkylation reagent used is one mol of chitosan monomer unit to 3–8 mol of hydroxyalkylation reagent.

7. The process as claimed in claim 1, wherein the drying is carried out by contact drying.

8. The process as claimed in claim 1, wherein the drying is carried out by roller drying.

9. The process as claimed in claim 8, wherein the roller drying is carried out at a roller temperature in the range from 90 to 140° C.

10. The process as claimed in claim 1, wherein the drying is carried out by convection drying.

11. The process as claimed in claim 1, wherein the convection drying is carried out by spray-drying.

12. A process for the preparation and work-up of N-hydroxyalkylchitosans soluble in aqueous medium, consisting of the steps of dispersion of chitosan in an aqueous medium consisting essentially of water, subsequent hydroxyalkylation of the dispersed chitosan with epoxides and subsequent work-up of the N-hydroxyalkylchitosan, which consists essentially of carrying out the hydroxyalkylation up to an average degree of substitution of 2.0 and performing the work-up of the N-hydroxyalkylchitosan by drying.

* * * * *